United States Patent
Sato

(10) Patent No.: US 9,146,354 B2
(45) Date of Patent: Sep. 29, 2015

(54) FUSION SPLICER

(75) Inventor: Ryuichiro Sato, Yokohama (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 57 days.

(21) Appl. No.: 14/234,754

(22) PCT Filed: Jul. 23, 2012

(86) PCT No.: PCT/JP2012/068608
§ 371 (c)(1),
(2), (4) Date: Jan. 24, 2014

(87) PCT Pub. No.: WO2013/015249
PCT Pub. Date: Jan. 31, 2013

(65) Prior Publication Data
US 2014/0165657 A1 Jun. 19, 2014

(30) Foreign Application Priority Data

Jul. 25, 2011 (JP) .................................. 2011-162072

(51) Int. Cl.
*G02B 6/255* (2006.01)
(52) U.S. Cl.
CPC ............ *G02B 6/2553* (2013.01); *G02B 6/2555* (2013.01)
(58) Field of Classification Search
USPC ............................... 65/485, 439, 501; 385/96
IPC ............................... G02B 6/255,6/2553, 6/2555
See application file for complete search history.

(56) References Cited

U.S. PATENT DOCUMENTS

| | | | | |
|---|---|---|---|---|
| 6,467,973 | B2* | 10/2002 | Takahashi et al. | 385/96 |
| 2003/0123836 | A1 | 7/2003 | Fujisawa et al. | |
| 2010/0260458 | A1* | 10/2010 | Sato | 385/96 |
| 2013/0236145 | A1* | 9/2013 | Sato | 385/96 |

FOREIGN PATENT DOCUMENTS

| | | |
|---|---|---|
| EP | 1 302 790 A1 | 4/2003 |
| JP | A-6-148454 | 5/1994 |
| JP | 9-113752 A | 5/1997 |
| JP | 2003-329873 A | 11/2003 |
| JP | 2005-352168 A | 12/2005 |
| JP | 2007-101785 A | 4/2007 |
| JP | 2008-151952 A | 7/2008 |
| JP | A-2010-015181 | 1/2010 |
| JP | A-2010-072245 | 4/2010 |
| JP | 2010-266567 A | 11/2010 |
| JP | 2011-107212 A | 6/2011 |
| WO | WO-2010/105959 A2 | 9/2010 |

* cited by examiner

*Primary Examiner* — Mark Halpern
(74) *Attorney, Agent, or Firm* — Drinker Biddle & Reath LLP

(57) ABSTRACT

A fusion splicer includes a pair of holder installation parts for mutually butting optical fibers in a first direction, and a fusion splicing part for mutually fusing and splicing the optical fibers by a pair of electrodes opposed along a second direction, and the holder installation part includes a base fixed to a body, and a positioning member in which a base fitting part fitted into the base is formed in a lower side, and the positioning member can be attached to and detached from both of the bases after an attitude is reversed, and a center position in a width direction along the second direction in the base fitting part is arranged in a straight line of the first direction passing through a center position between the electrodes even in a state in which the positioning member is fitted into any of the bases.

4 Claims, 16 Drawing Sheets

FUSION SPLICER

This application is a 371 of PCT/JP2012/068608 filed 23 Jul. 2012.

TECHNICAL FIELD

The present invention relates to a fusion splicer for mutually fusing and splicing optical fibers.

BACKGROUND ART

A known apparatus (fusion splicer) for mutually fusing and splicing optical fibers is an apparatus for gripping a coated part of the optical fiber by an optical fiber gripping part and receiving a bared optical fiber part exposed to the distal end beyond this coated part in a groove of a groove stand formed in the inside beyond the optical fiber gripping part and aligning the bared optical fiber part (for example, see Patent Reference 1).

An optical fiber holder which is the optical fiber gripping part of the fusion splicer has a holding lid rotatably joined to the back side of the fusion splicer beyond a position in which the optical fiber is gripped, and the optical fiber is gripped or its grip of the optical fiber is released by opening this holding lid from the front side to the back side or closing the holding lid from the back side to the front side. Also, the fusion splicer includes an apparatus for providing the back side beyond the optical fiber holder in the fusion splicer with a reinforcing work part for reinforcing the fused optical fibers by a heat-shrink tube etc.

PRIOR ART REFERENCE

Patent Reference

Patent Reference 1: JP-A-2005-352168

DISCLOSURE OF THE INVENTION

Problems that the Invention is to Solve

For example, in the case of fusing optical fibers of an optical cable laid in a high place as an environment using a fusion splicer, the optical fibers are pulled out of a closure in the back side (rear side) of the fusion splicer to the front side and arc fused in the high place and the fused optical fibers are moved to the back side in the fusion splicer and reinforcing work is done in a reinforcing work part and thereafter, the optical fibers are further moved to the back side and are returned to the closure. In this case, the fused optical fibers are moved to the back side when viewed from a worker in a series of subsequent operations. Depending on an environment etc. of a fusion work site, for example, in the case of manufacturing an optical component inside a factory, the front and back of the fusion splicer are reversed (turned to the rear side of the worker) and the fused optical fibers are moved to the front side when viewed from the worker, and reinforcing work is done in the reinforcing work part and thereafter, the optical fibers may be further moved to the front side beyond the fusion splicer to do assembly work etc. In that case, a holding lid of an optical fiber holder is opened with the holding lid turned to the front side of the worker, and it becomes difficult to visually recognize the optical fibers due to the opened holding lid and it becomes complicated to do work. In this case, it is contemplated to mount the optical fiber holder in a left-right reverse direction and change an opening/closing shaft of the holding lid to the back side when viewed from the worker.

Incidentally, as shown in FIG. 18, in an optical fiber holder 1, a receiving groove 7 for receiving an optical fiber 2 may be offset with respect to a center position of the optical fiber holder 1.

For example, as shown in FIG. 19, a multi-fiber fusion splicer for fusing a four-fiber optical fiber ribbon having four optical fibers 2 includes a groove stand 5 having four grooves 4 for supporting each of the optical fibers 2. In the case of fusing the single-fiber optical fiber 2 in such a multi-fiber fusion splicer, the peak portion of the groove stand 5 is arranged in the center between electrodes 6, so that the optical fiber 2 cannot be arranged in the center between the electrodes 6 and as shown in FIG. 20, the optical fiber 2 is arranged in the groove 4 deviating from the center between the electrodes 6. Consequently, in the single-fiber optical fiber holder 1, the receiving groove 7 for holding the optical fiber 2 is offset from the center position.

In the case of using the optical fiber holder 1 whose receiving groove 7 is offset with respect to the center position in a single-fiber fusion splicer thus, a butted position of the optical fibers 2 greatly (two times the offset dimension) deviates from a fusion point which is the center between the electrodes 6 when the optical fiber holder 1 is mounted in a left-right reverse direction. Also, the fusion point is photographed by microscopes 8 and fusion work is done while viewing its image, and when the butted position of the optical fibers 2 greatly deviates from the fusion point, the image of the microscopes 8 becomes unclear.

Consequently, the optical fiber holder 1 cannot be mounted in the left-right reverse direction since good fusion work cannot be done when the optical fiber holder 1 is mounted in the left-right reverse direction in the fusion splicer described above. As a result, even when a worker does fusion work from the rear side of the fusion splicer, it is inevitable to open and close the holding lid of the optical fiber holder 1 to the front side when viewed from the worker.

An object of the invention is to provide a fusion splicer capable of fusing optical fibers smoothly and well even when a worker works from any of the front and the back of the fusion splicer.

Means for Solving the Problems

A fusion splicer of the invention which can solve the problems is characterized in that:

a body of the fusion splicer is provided with a pair of holder installation parts configured to detachably attach optical fiber holders which holds optical fibers and to mutually but the optical fibers in a first direction, and a fusion splicing part configured to mutually fuse and splice the optical fibers by a pair of electrodes opposed along a second direction orthogonal to the first direction, and that:

the holder installation part includes a base fixed to the body, and a positioning member in which a holder fitting part fitted into the optical fiber holder is formed in an upper side and a base fitting part fitted into the base is formed in a lower side, and the positioning member can be attached to and detached from both of the bases after an attitude is reversed so as to have the same end turned to the fusion splicing part, and a center position in a width direction along the second direction in the base fitting part is arranged in a straight line of the first direction passing through a center position between the electrodes even in a state in which the positioning member is fitted into any of the bases.

In the fusion splicer of the invention, it is preferable that the base fitting part has the same width along the first direction, and the holder fitting part is a protrusion having the same width along the first direction and a center position in a width direction along the second direction of the holder fitting part differs from that of the base fitting part.

The fusion splicer of the invention preferably comprises: a microscope configured to observe a gap between the electrodes, and a monitor configured to display an image obtained by the microscope and capable of changing a vertical attitude to the body and reversing and displaying a vertical direction of the image.

Advantage of the Invention

According to the invention, even when the positioning members formed on a pair of holder installation parts are attached to the bases after the attitudes are reversed so as to have the same ends turned to the fusion splicing part, the center position in the width direction along the second direction in the base fitting part is arranged in a straight line of the first direction passing through the center position between the electrodes. That is, even when a receiving groove for receiving the optical fiber of the optical fiber holder is offset from the center position, the optical fiber is arranged in the center position between the electrodes. Consequently, when a worker does fusion work from the rear side of the fusion splicer, the optical fiber holder is detached from one holder installation part and is reversed and is attached to the other holder installation part in the opposite direction and thereby, work of holding the optical fiber in the optical fiber holder and fusion work of the optical fibers can be done smoothly and well like the case of doing the work from the front side.

MODE FOR CARRYING OUT THE INVENTION

An example of an embodiment of a fusion splicer according to the invention will hereinafter be described with reference to the drawings.

Figure 1:
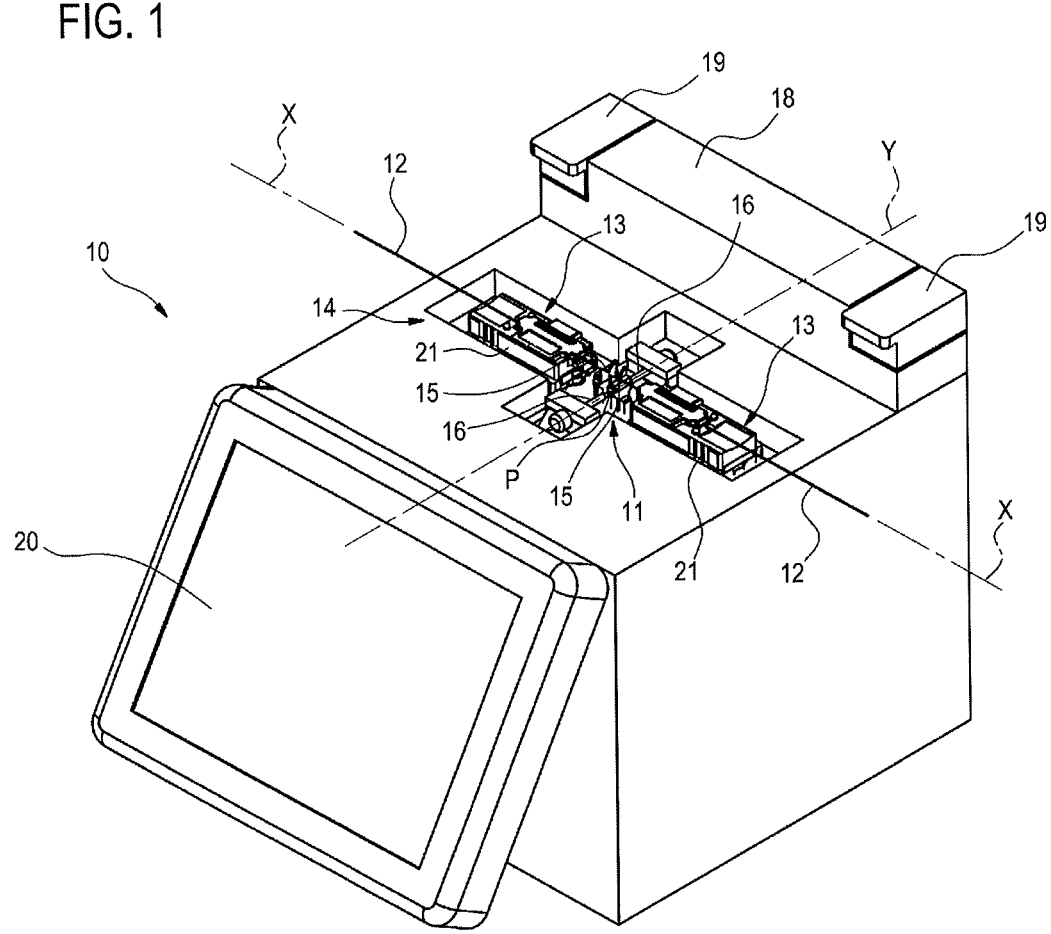
FIG. 1 is a perspective view showing a structural example of a fusion splicer according to the invention.
Figure 2:
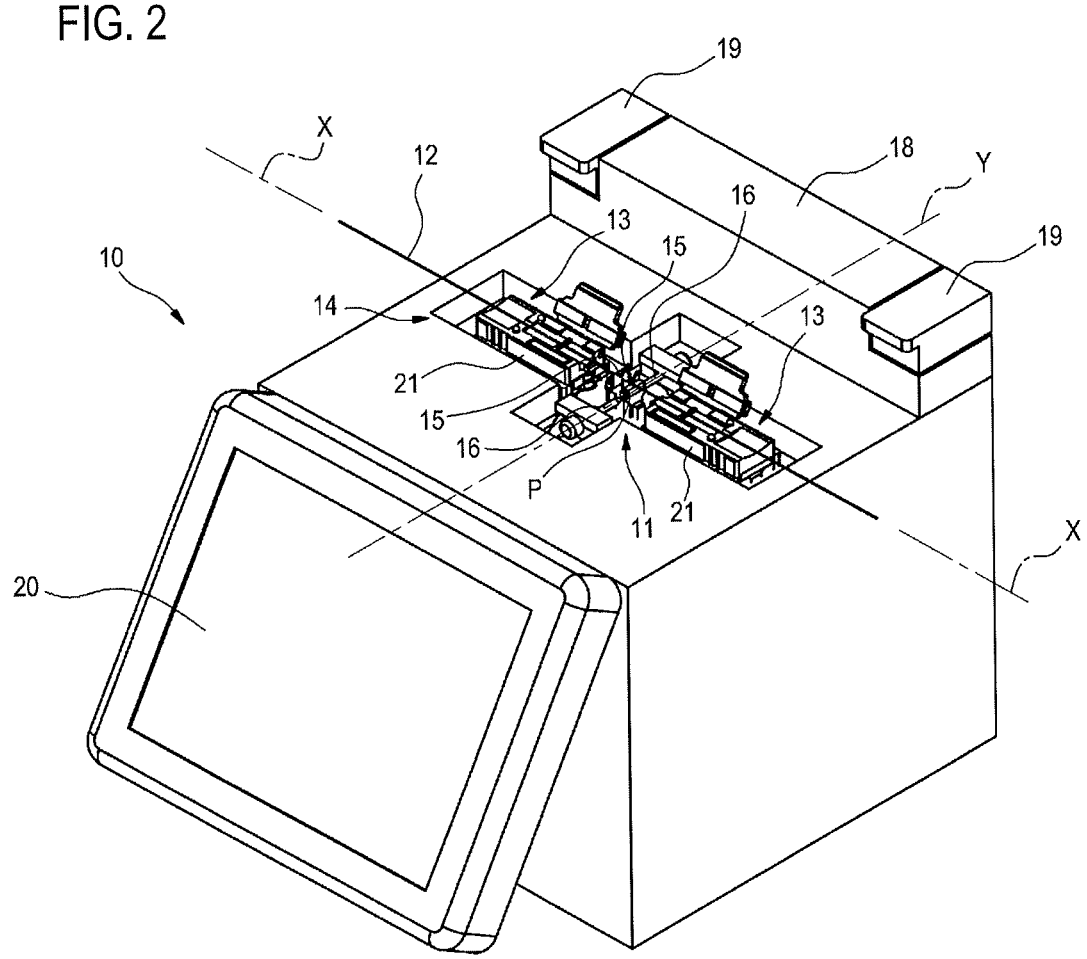
FIG. 2 is a perspective view of a state in which an optical fiber holder is opened in the fusion splicer of FIG. 1.

As shown in FIGS. 1 and 2, a fusion splicer 10 is, for example, an apparatus for mutually fusing and splicing optical fibers 12 inside a factory for manufacturing an optical component or a site on which construction of optical fiber equipment is performed.

This fusion splicer 10 includes a fusion processing unit 14 having a pair of holder installation parts 13 in which optical fiber holders 21 for holding the vicinities of ends of the optical fibers 12 are detachably mounted, and a fusion splicing part 11 for mutually fusing and splicing the optical fibers 12. Then, by attaching the optical fiber holders 21 to the holder installation parts 13, the optical fibers 12 held in the respective optical fiber holders 21 are positioned in predetermined positions and these optical fibers 12 are mutually butted in a first direction X along a width direction of the fusion splicer 10.

Figure 3:
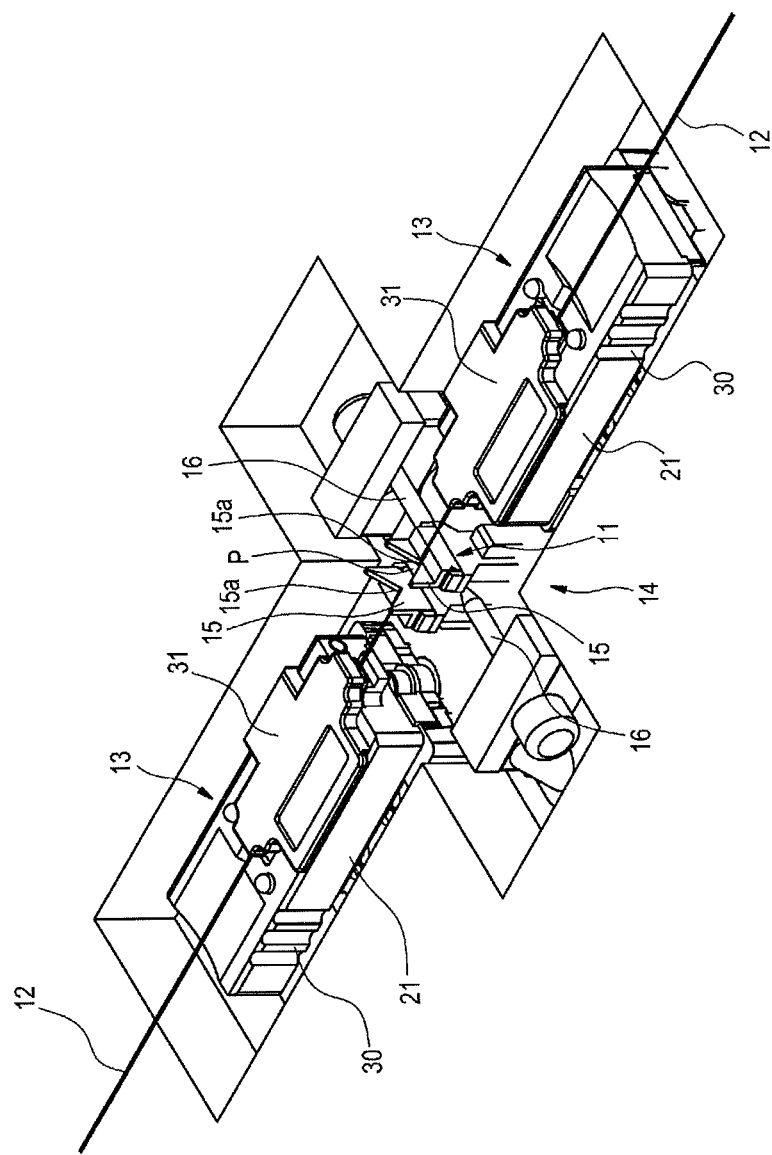
FIG. 3 is a perspective view of a fusion splicing part of the fusion splicer of FIG. 1.
Figure 4:
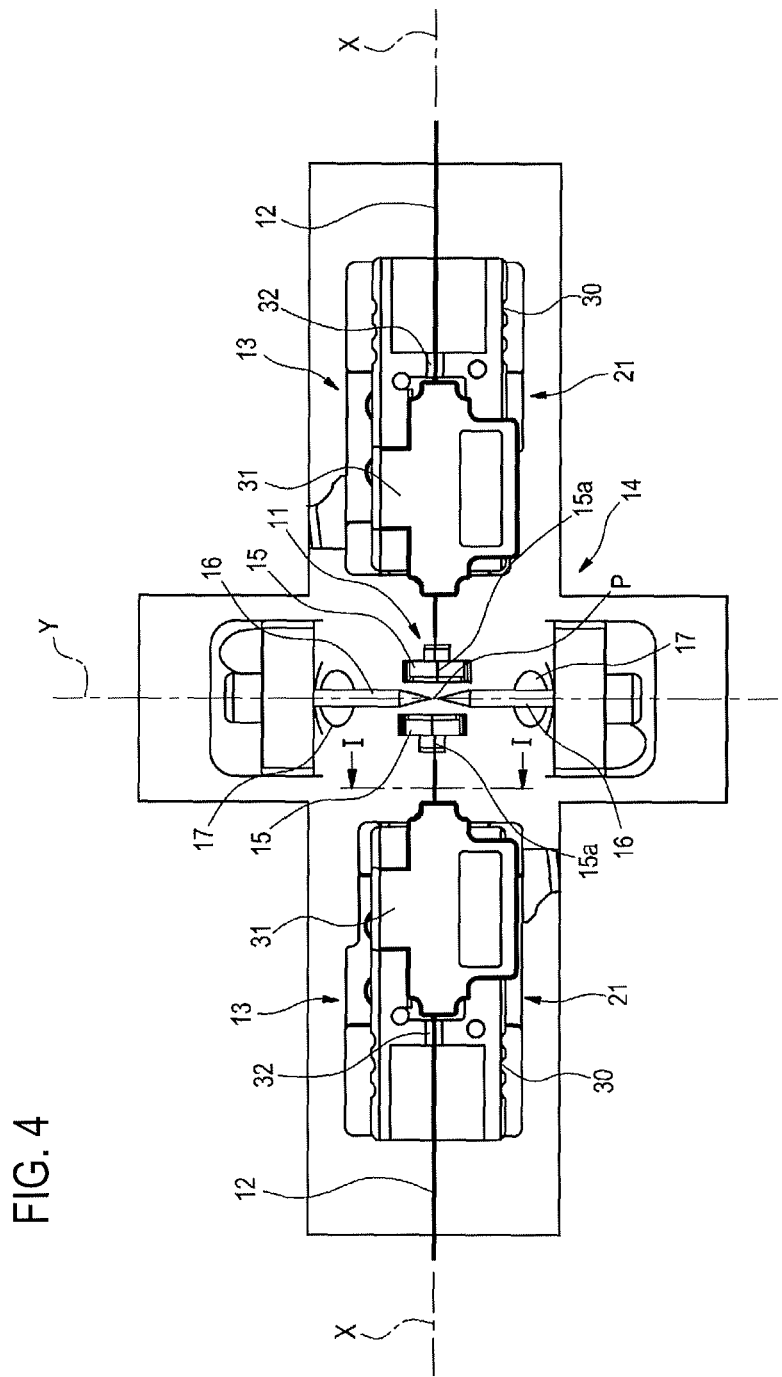
FIG. 4 is a plan view of the fusion splicing part of the fusion splicer of FIG. 1.

As shown in FIGS. 3 and 4, the fusion splicing part 11 includes a pair of V groove members 15 having V grooves 15a for positioning positions of the distal ends of the optical fibers 12 extending from the optical fiber holders 21 attached to the respective holder installation parts 13, and a pair of electrodes 16 which is arranged between the pair of V groove members 15 and fuses end faces of the butted optical fibers 12 by electric discharge. These electrodes 16 are arranged so as to be opposed along a second direction Y orthogonal to the first direction X. Then, the fusion splicing part 11 mutually thermally fuses and splices the optical fibers 12 positioned at a fusion point P of an intersection point of the first direction X and the second direction Y.

Figure 5:
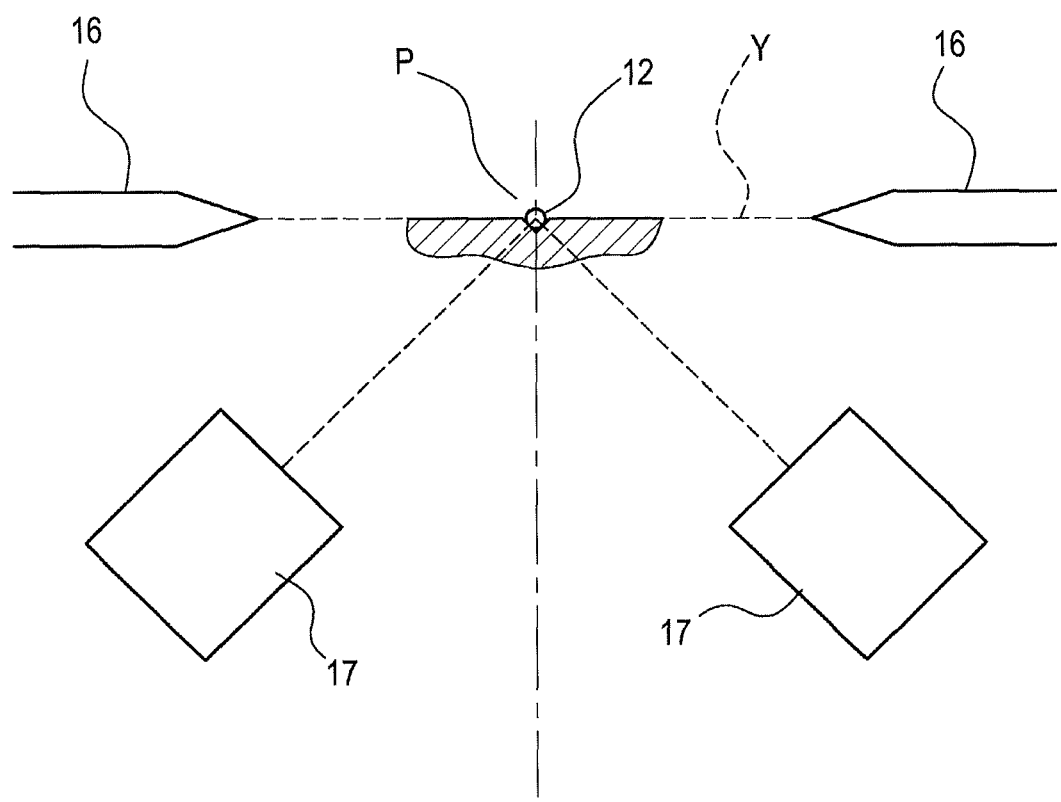
FIG. 5 is a schematic side view showing an internal configuration of the fusion splicer of FIG. 1.

Also, as shown in FIGS. 4 and 5, the fusion processing unit 14 is provided with a pair of microscopes 17 including imaging elements such as CCDs in the lower side of the fusion splicing part 11. These microscopes 17 are respectively arranged upwardly obliquely by about 45° toward the intersection point of the first direction X and the second direction Y, that is, the fusion point P at which the optical fibers 12 are fused, and are respectively focused on the fusion point P.

The dimensions of the V groove members 15 for positioning the optical fibers 12 are set so that the mutually spliced optical fibers 12 are supported and positioned in a straight line along the first direction X by the V grooves 15a.

In addition, the fusion processing unit 14 is constructed so as to be opened and closed by an opening/closing cover (not shown). This opening/closing cover is constructed so as to be opened to the front side of the apparatus.

Also, the fusion splicer 10 includes a heat-shrink processing unit 18 for doing reinforcing work of heating and shrinking a heat-shrink tube (not shown) for covering the outer periphery of a place in which the optical fibers 12 are mutually fused and spliced by a heater. The heat-shrink processing unit 18 is formed on the back side of the apparatus adjacently to the fusion processing unit 14.

This heat-shrink processing unit 18 also includes holder installation parts 19 in which the optical fiber holders 21 for holding the ends of the optical fibers 12 are detachably mounted. Then, by attaching the optical fiber holders 21 to the holder installation parts 19, the place in which the optical fibers 12 are mutually fused and spliced is positioned and arranged in the heat-shrink processing unit 18. Or, the holder installation parts 19 form an optical fiber gripping part, and the fused optical fibers 12 may be detached from the optical fiber holders 21 of the fusion processing unit 14 and be gripped by its optical fiber gripping part.

This heat-shrink processing unit 18 has heating temperature distribution in the heater so that the center of the heat-shrink tube is heated and shrunk by the heater and then the end is shrunk. Accordingly, air bubbles generated inside the heat-shrink tube at the time of heating are made easy to come out of both ends.

Also, the fusion splicer 10 is provided with a monitor 20 in the front side. This monitor 20 is means for displaying an image of a fusion place photographed by the microscopes 17, and is constructed so that a worker can do fusion work while viewing the image of this monitor 20. Also, this monitor 20 combines an operating part for actuating the fusion splicing part 11 and the heat-shrink processing unit 18, and various operations can be performed by touching the monitor 20. This monitor 20 is joined to an upper portion the fusion splicer 10 rotatably around an axis line of a horizontal direction. Accordingly, this monitor 20 can be changed in an attitude (see FIGS. 1 and 2) turned to the front in the front side of the apparatus and an attitude (see FIGS. 11 and 13) turned to the back in the upper side of the apparatus. Then, when the monitor 20 is arranged in the attitude turned to the back in the upper side of the apparatus, a vertical direction of the displayed image can be reversed.

Figure 6:
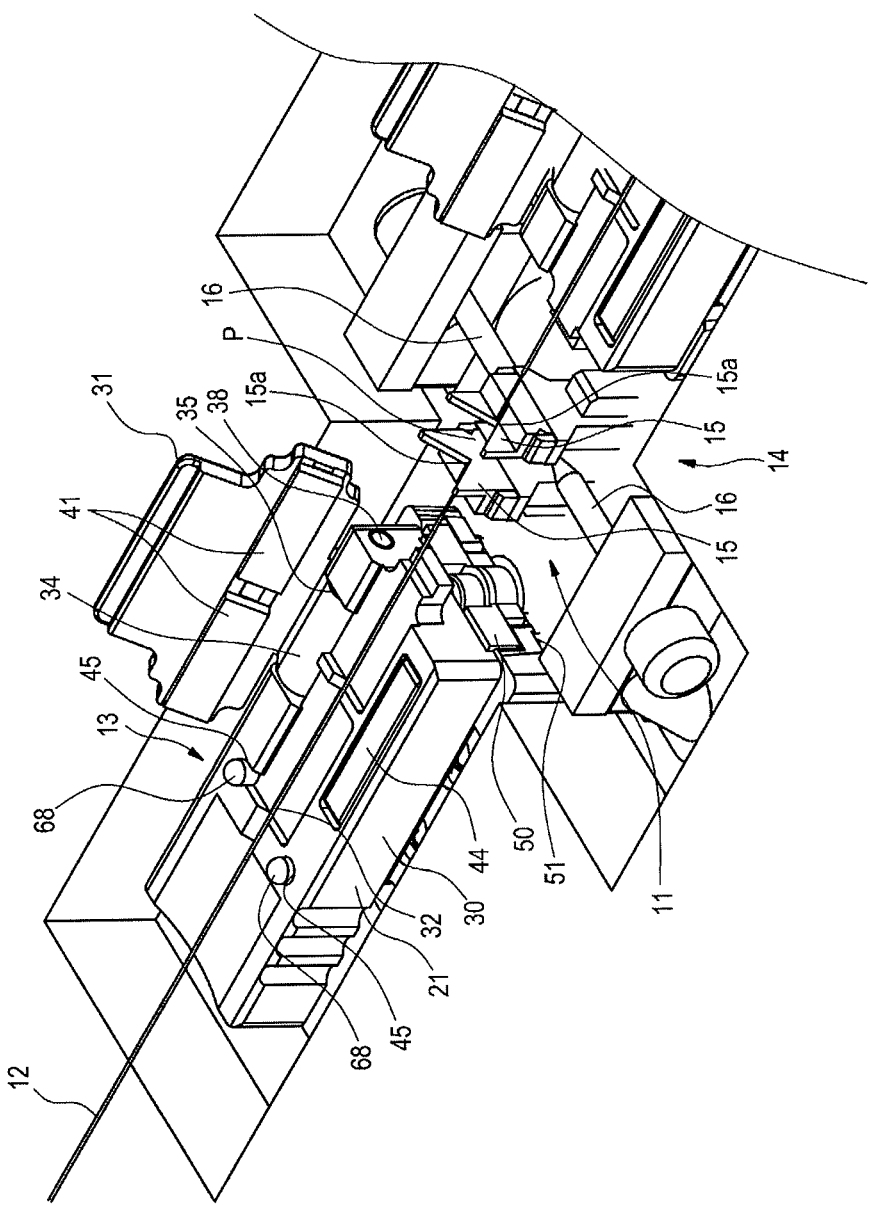
FIG. 6 is a perspective view showing a structure of the optical fiber holder attached to a holder installation part.

As shown in FIG. 6, the optical fiber holder 21 has a holder body 30 formed in substantially a rectangular parallelepiped shape. A receiving groove 32 for receiving the optical fiber 12 is formed in an upper surface of the holder body 30.

One lateral part of the holder body 30 is provided with a holding lid 31. The holding lid 31 has a hinge part 34, and this hinge part 34 is arranged in a holding groove 35 formed in the holder body 30. The holder body 30 is provided with a joining pin 38 extending through the holding groove 35, and this joining pin 38 is inserted into an insertion hole formed in the hinge part 34. Accordingly, the holding lid 31 is rotatably joined to the holder body 30 around an axis line of the joining pin 38. An upper surface of the holder body 30 is opened and closed by rotating the holding lid 31. Then, the holding lid 31 is arranged so as to cover the upper portion of receiving groove 32 by rotating the holding lid 31 toward the upper surface side of the holder body 30.

The holding lid 31 is provided with a press plate part 41 made of an elastic material such as rubber on a surface opposed to the holder body 30, and the press plate part 41 is arranged in the upper portion of receiving groove 32 by rotating the holding lid 31 toward the upper surface side of the holder body 30.

Also, the holder body 30 is provided with a magnet 44 on an upper surface opposite to one lateral part to which the holding lid 31 is joined, and this holding lid 31 is constructed so as to make contact with the magnet 44 when the holding lid 31 is arranged on the upper surface of the holder body 30. The holding lid 31 is formed of a magnetic substance such as iron and thereby, the holding lid 31 is attracted by a magnetic force of the magnet 44 in a state arranged on the upper surface of the holder body 30. Thus, the optical fiber holder 21 holds the optical fiber 12 by attracting the holding lid 31 to the holder body 30 by the magnetic force of the magnet 44.

Figure 7:
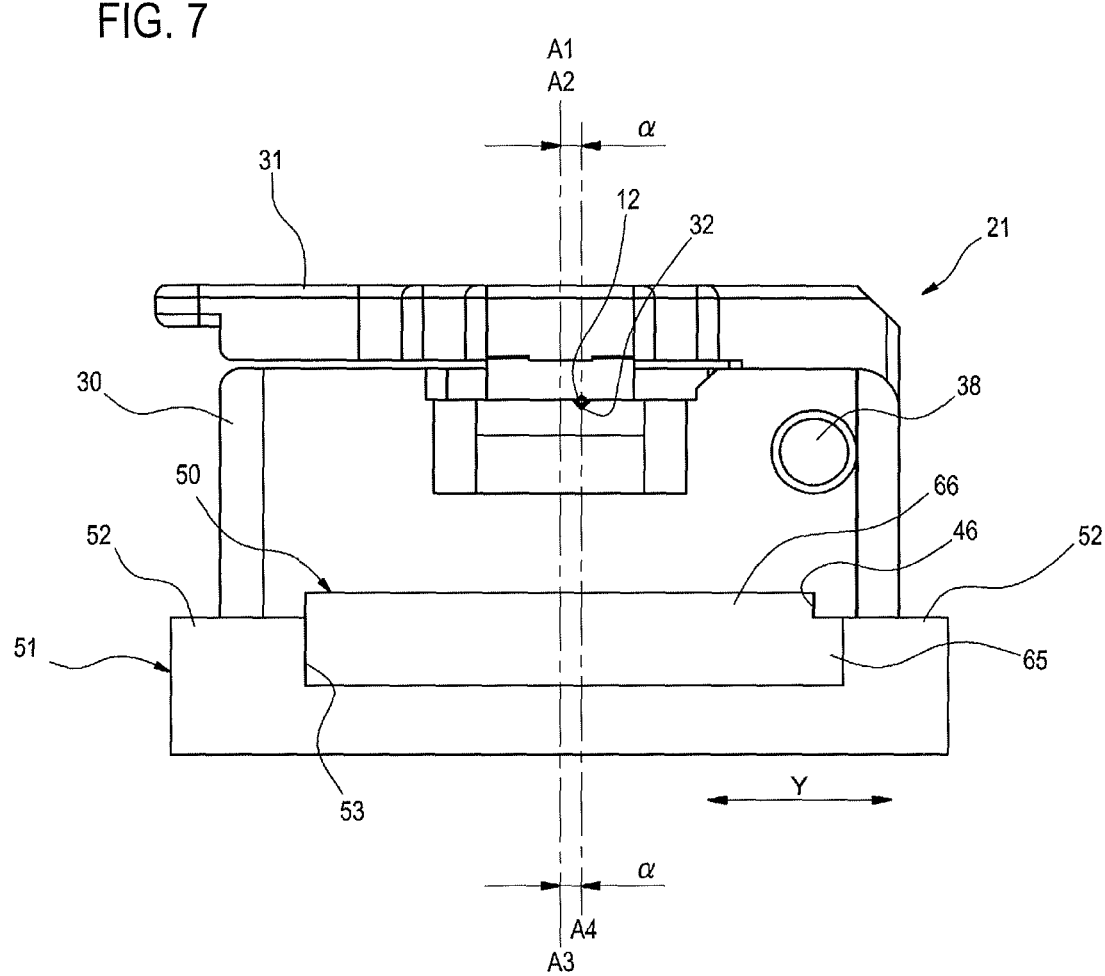
FIG. 7 is a view taken on arrow I-I in FIG. 4.

Two positioning holes 45 through the front and the back are formed in this optical fiber holder 21. Also, as shown in FIG. 7, a positioning groove 46 is formed in the bottom of the optical fiber holder 21. In this positioning groove 46, a center position A1 in a width direction along the second direction Y matches with a center position A2 in a width direction of the optical fiber holder 21. On the other hand, the receiving groove 32 for receiving the optical fiber 12 is offset by a predetermined dimension α to one side (the rear side of the apparatus) with respect to the center position A1 of the positioning groove 46 and the center position A2 of the optical fiber holder 21.

Figure 8:
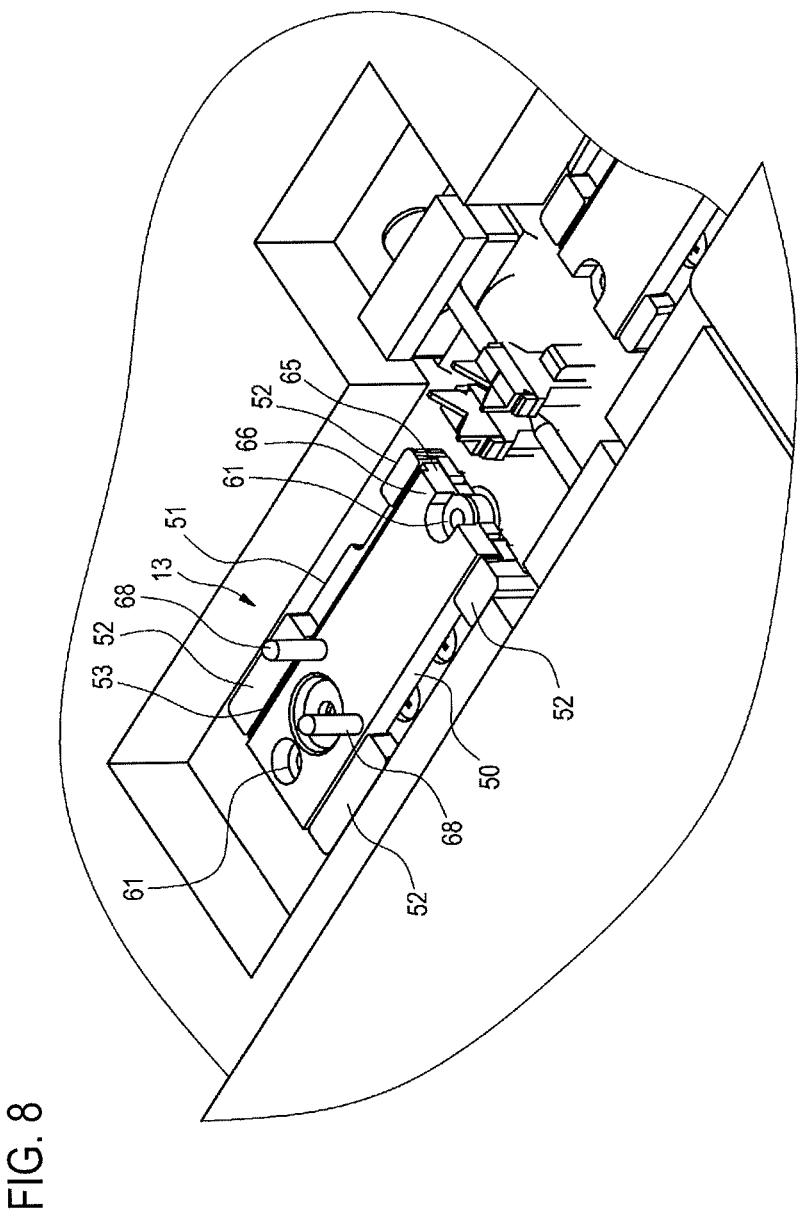
FIG. 8 is a perspective view showing the holder installation part in the fusion splicing part.
Figure 9:
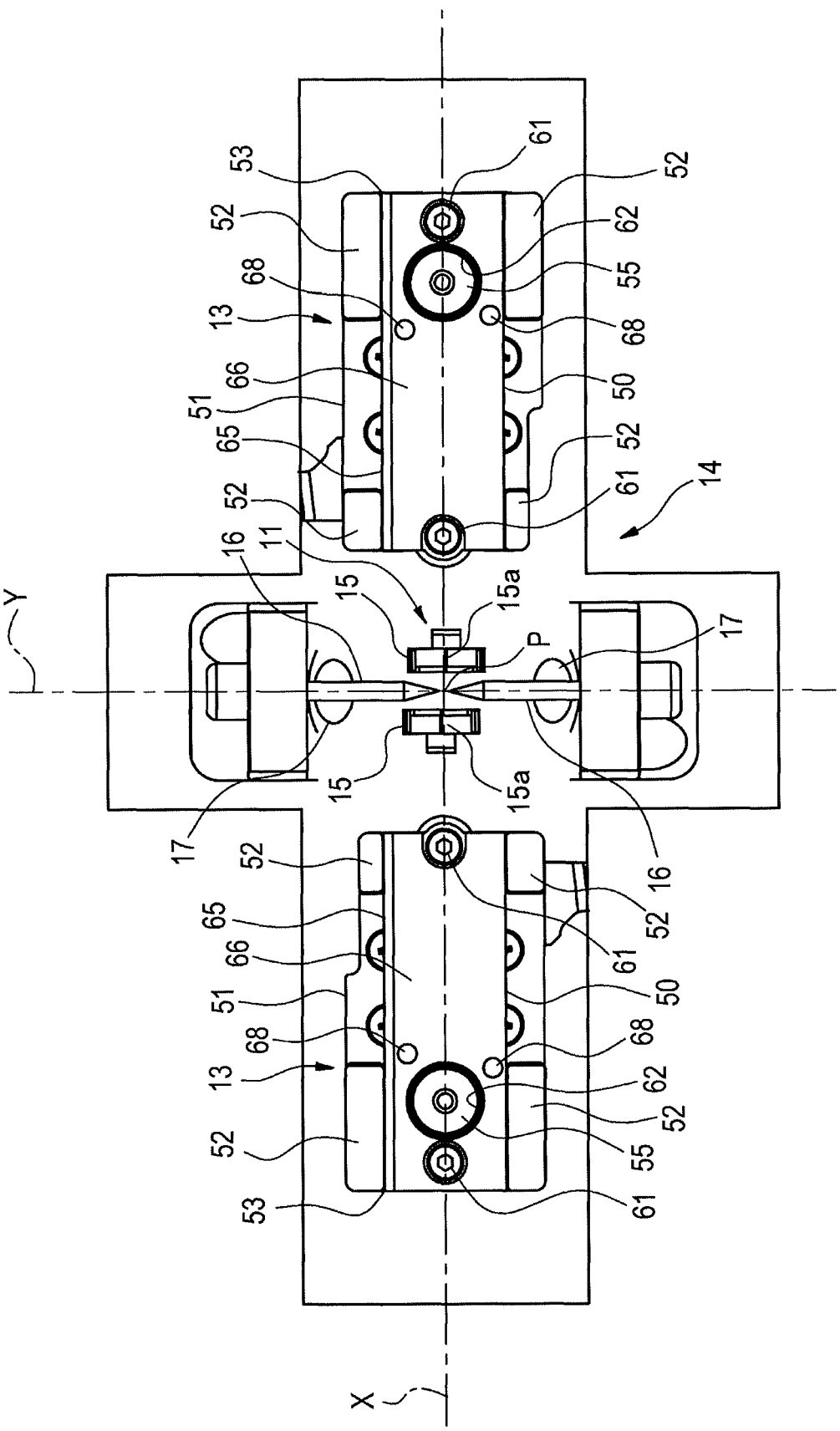
FIG. 9 is a plan view of the fusion splicing part in a state in which the optical fiber holders are detached.

As shown in FIGS. 8 and 9, the holder installation part 13 includes a positioning member 50. This positioning member 50 can be attached to and detached from a base 51 fixed to a body of the fusion splicer 10 as shown in FIG. 10.

Figure 10:
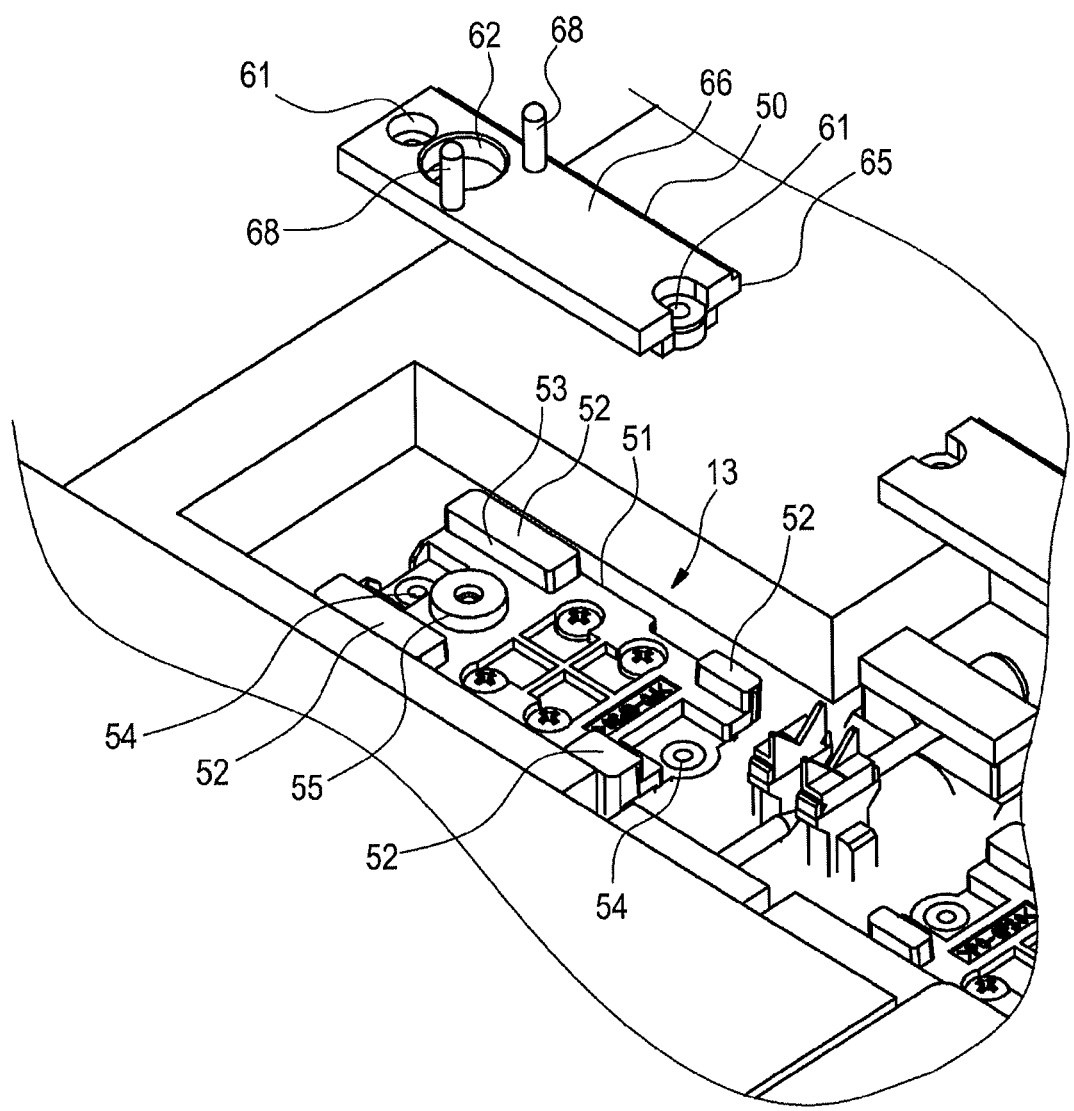
FIG. 10 is an exploded perspective view of the holder installation part in the fusion splicing part.

As shown in FIG. 10, engaging projecting bars 52 are formed on both lateral parts of the base 51. An engaging recess 53 extending along the first direction X is formed between these engaging projecting bars 52, and the positioning member 50 is fitted into this engaging recess 53 to hold the positioning member 50. Also, screw holes 54 are respectively formed in the bottom of the engaging recess 53 in the vicinities of both ends of the base 51. Also, a positioning projection 55 is formed on the bottom of the engaging recess 53 between these screw holes 54. In addition, the bases 51 are urged in a direction mutually separated by a spring (not shown) etc. formed in the lower portions of the bases 51.

The positioning member 50 is formed in a flat plate shape, and screw insertion holes 61 are formed in the vicinities of both ends of the positioning member 50. Also, a fitting hole 62 is formed between the screw insertion holes 61 in the positioning member 50.

Then, when this positioning member 50 is fitted into the engaging recess 53 of the base 51, the positioning projection 55 is fitted into the fitting hole 62 and the screw insertion holes 61 are inserted into the screw holes 54. In this state, screws (not shown) are inserted into the screw insertion holes 61 and are screwed into the screw holes 54 to thereby fix the positioning member 50 to the base 51.

Also, a pair of positioning pins 68 projecting upwardly is formed in positions near to both lateral parts of this positioning member 50. These positioning pins 68 are inserted into the positioning holes 45 formed in the optical fiber holder 21 and are attached with the optical fiber holder 21 positioned to the positioning member 50.

As shown in FIGS. 7 and 10, the lower side of the positioning member 50 is formed in a base fitting part 65 capable of being fitted into the engaging recess 53 of the base 51. Also, a holder fitting part 66 is formed in the upper side of this positioning member 50. The holder fitting part 66 is made of a protrusion having the same width along the first direction X, and a center position A4 in a width direction along the second direction Y of the base fitting part 65 is offset by a predetermined dimension α to one side (the back side of the apparatus) with respect to a center position A3 in a width direction along the second direction Y of this holder fitting part 66.

And, the center position A2 in the width direction of the optical fiber holder 21 attached to the base 51 through this positioning member 50 matches with the center position A3 in the width direction of the holder fitting part 66 of the positioning member 50, and a position of the receiving groove 32 matches with the center position A4 in the width direction of the base fitting part 65 of the positioning member 50.

The positioning member 50 can be attached to and detached from both of the bases 51 after an attitude is reversed so as to have the same end turned to the fusion point P of the fusion splicing part 11, and the center position A4 in the width direction along the second direction Y in the base fitting part 65 is arranged in a straight line of the first direction X passing through a center position between the electrodes 16 even in a state in which the positioning member 50 is fitted into any of the right and left bases 51.

Next, a method for mutually fusing and splicing the optical fibers 12 will be described.

First, the respective optical fibers 12 to be mutually spliced are held by the optical fiber holders 21 attached to the holder installation parts 13 of the fusion splicer 10 (see FIG. 1). In addition, in the case of holding the optical fibers 12 by the optical fiber holders 21 thus, a heat-shrink tube is inserted into any one of the optical fibers 12.

When this is done, the optical fibers 12 extending out of the optical fiber holders 21 are positioned by the V grooves 15a of the V groove members 15 of the fusion splicing part 11, and the ends of the optical fibers 12 are butted at the fusion point P of the fusion splicing part 11. At that time, an image of the fusion point P photographed by the microscopes 17 is displayed on the monitor 20 of the fusion splicer 10.

In this state, a worker operates the fusion splicer 10 while viewing the image of the monitor 20, and performs electric discharge by the electrodes 16, and mutually fuses and splices end faces of the optical fibers 12.

Thus, the worker can smoothly do fusion work of the optical fibers 12 while viewing the image of the fusion point P photographed by the microscopes 17 and displayed on the monitor 20.

After the optical fibers 12 are mutually fused and spliced, the holding lids 31 of the respective optical fiber holders 21 are rotated and opened against magnetic forces of the magnets 44, and holding of the optical fibers 12 is released, and the optical fibers 12 mutually fused and spliced are detached.

Thereafter, a fused and spliced place of the optical fibers 12 is reinforced.

Concretely, a reinforcing member (not shown) is first applied to the fused and spliced place, and the fused and spliced place is covered with a heat-shrink tube. Then, the respective optical fiber holders 21 are held by the respective holder installation parts 19 of the heat-shrink processing unit 18 in the rear side of the apparatus.

When this is done, the optical fibers 12 are held by the optical fiber holders 21, and the fused and spliced place of the optical fibers 12 covered with the heat-shrink tube is positioned and arranged in the heat-shrink processing unit 18.

In this state, a heater is heated and the heat-shrink tube is thermally shrunk by the heater. Accordingly, the reinforcing member is applied to the fused and spliced place of the mutual optical fibers 12 and further, the fused and spliced place is covered with the heat-shrink tube in close contact and is integrated and reinforced.

Incidentally, the worker may do the fusion work described above not only in the front side of the apparatus of the fusion splicer 10 but also in the rear side of the apparatus.

Figure 11:
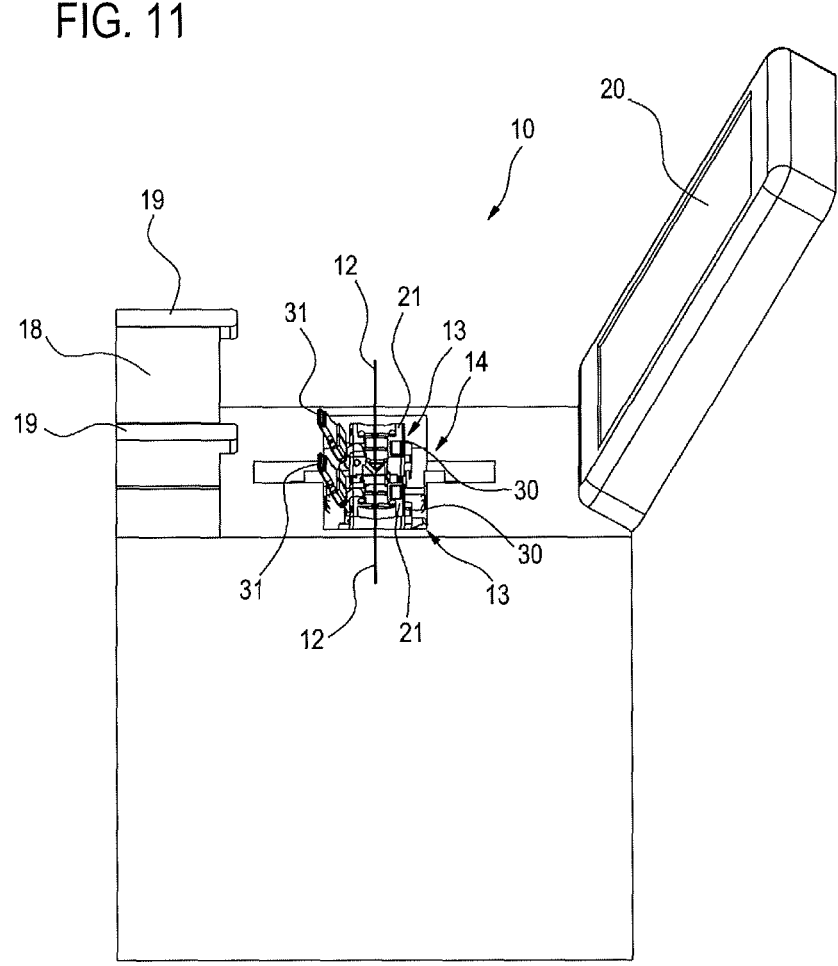
FIG. 11 is a side view of the fusion splicer showing the case of doing work from the rear side of the apparatus without replacing the right and left optical fiber holders.

In such cases, in the fusion splicer 10 according to the present embodiment, fusion splicing can be performed while viewing the monitor 20 from the rear side of the apparatus by rotating the monitor 20 and arranging the monitor 20 to the upward side of the apparatus as shown in FIG. 11. However, even when the monitor 20 is simply rotated and a visual check can be made from the rear side of the apparatus, the holding lids 31 of the respective optical fiber holders 21 are only opened to the rear side and it is difficult for the worker to do holding work etc. of the optical fibers 12.

Figure 12:
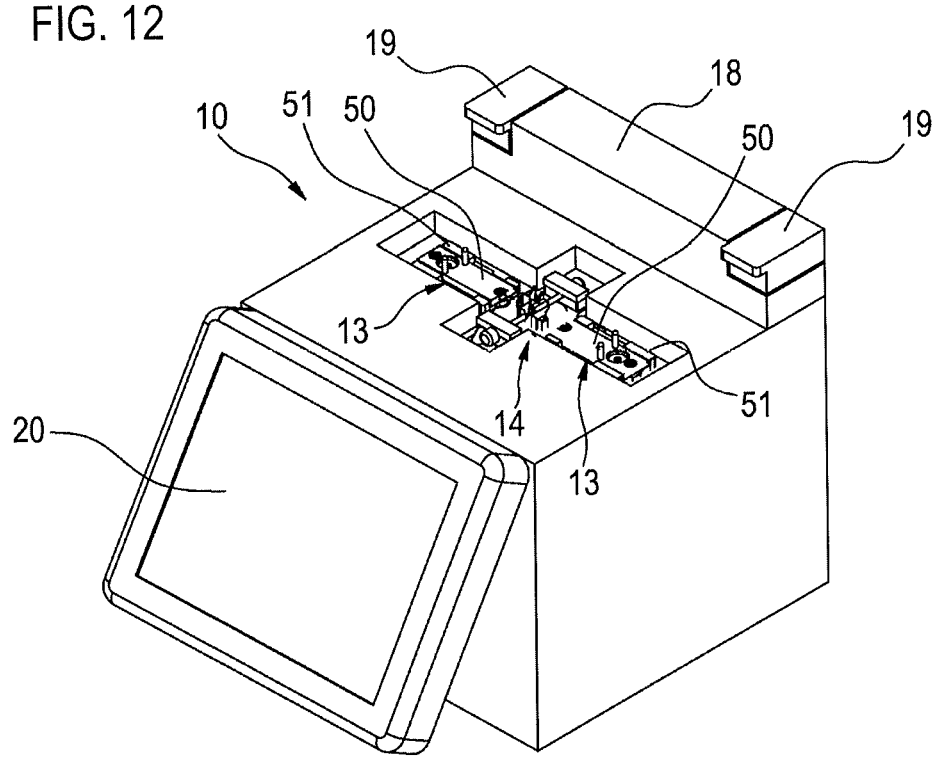
FIG. 12 is a perspective view viewed from the front side of the fusion splicer showing replacement work of positioning members.
Figure 13:
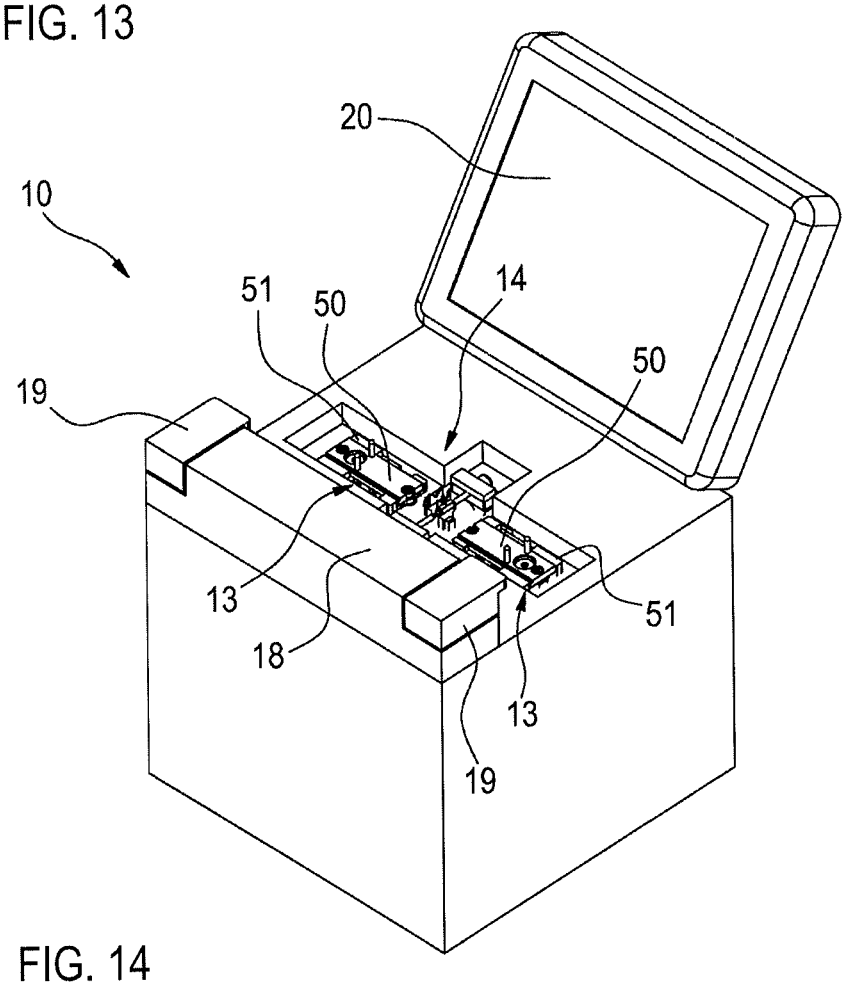
FIG. 13 is a perspective view viewed from the rear side of the fusion splicer showing the replacement work of the positioning members.

Because of this, in the case of fusing the optical fibers 12 from the back side of the apparatus in the present embodiment, the optical fiber holders 21 are first detached as shown in FIG. 12, and replacement work of the positioning members 50 is done after the monitor 20 is rotated and is arranged to the upward side of the apparatus as shown in FIG. 13.

This replacement work of the positioning members 50 will be described.

Figure 14:
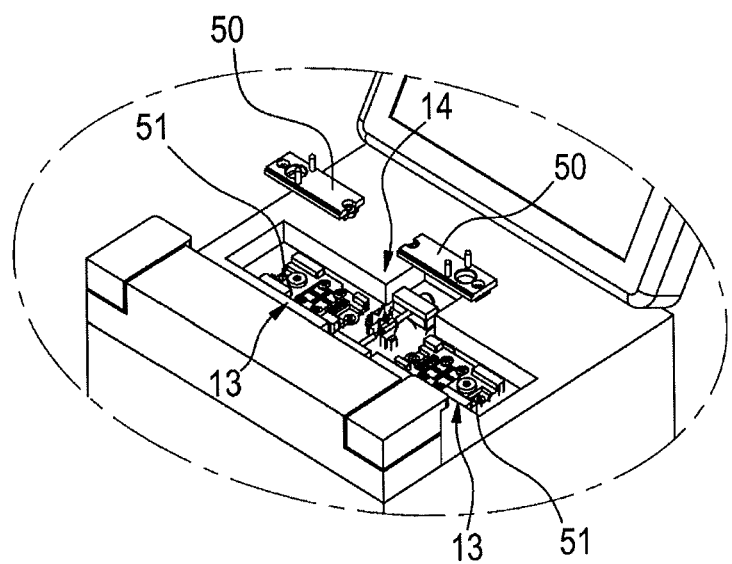
FIG. 14 is a perspective view viewed from the rear side of the fusion splicing part of the fusion splicer showing the replacement work of the positioning members.

First, the positioning members 50 are detached from the bases 51 of the respective holder installation parts 13 as shown in FIG. 14.

Figure 15:
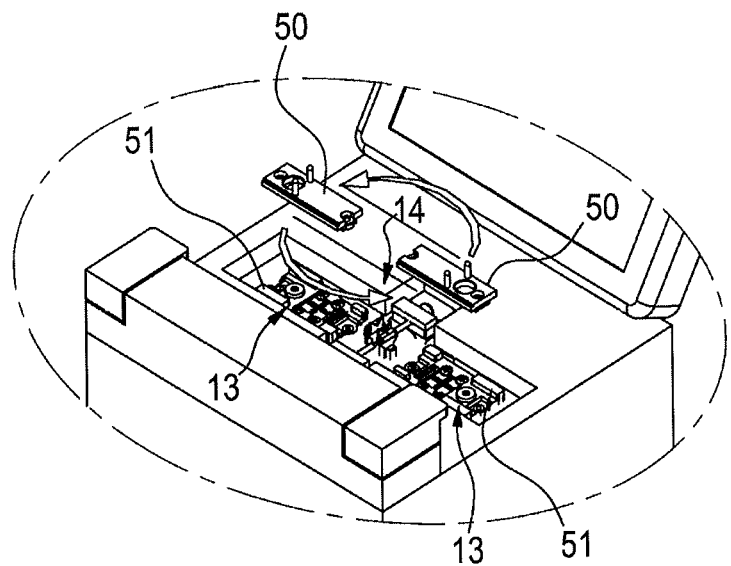
FIG. 15 is a perspective view viewed from the rear side of the fusion splicing part of the fusion splicer showing the replacement work of the positioning members.

Then, as shown in FIG. 15, the detached positioning members 50 are respectively arranged to the sides of the opposite holder installation parts 13 after attitudes of the positioning members 50 are reversed so as to have the same ends turned to the fusion point P.

Figure 16:
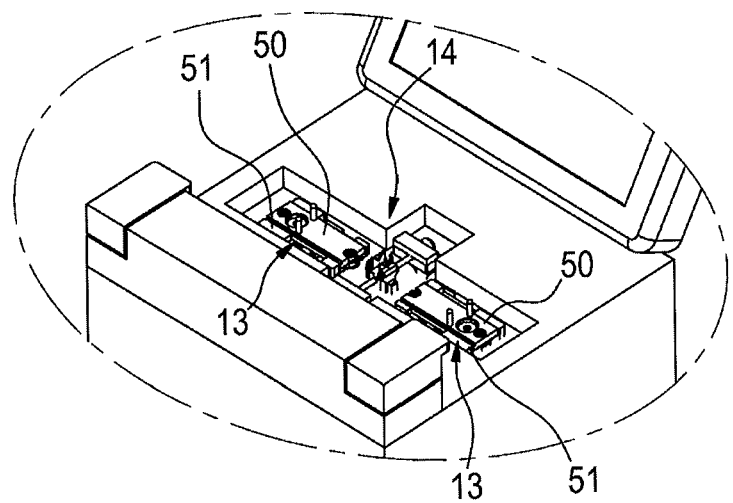
FIG. 16 is a perspective view viewed from the rear side of the fusion splicing part of the fusion splicer showing the replacement work of the positioning members.

Thereafter, as shown in FIG. 16, the positioning members 50 are attached to the bases 51 of the holder installation parts 13.

When this is done, an offset direction of the center position A4 in the width direction of the base fitting part 65 with respect to the center position A3 in the width direction of the holder fitting part 66 in the positioning member 50 changes to the opposite side (the front side of the apparatus).

After the right and left positioning members 50 are replaced thus, the right and left optical fiber holders 21 are also replaced and are attached to the respective positioning members 50. Then, when the right and left optical fiber holders 21 are replaced, offset directions of the receiving grooves 32 of the respective optical fiber holders 21 change to the opposite side (the front side of the apparatus).

Since the offset direction of the center position A4 in the width direction of the base fitting part 65 with respect to the center position A3 in the width direction of the holder fitting part 66 in the positioning member 50 also changes to the opposite side (the front side of the apparatus) at this time, the receiving grooves 32 are arranged in a straight line of the first direction X passing through a center position between the electrodes 16 like a state before the replacement work.

Then, in a state in which the right and left optical fiber holders 21 are replaced, the holding lids 31 of the optical fiber holders 21 are opened toward the back side when viewed from a worker of the rear side of the apparatus.

Figure 17:
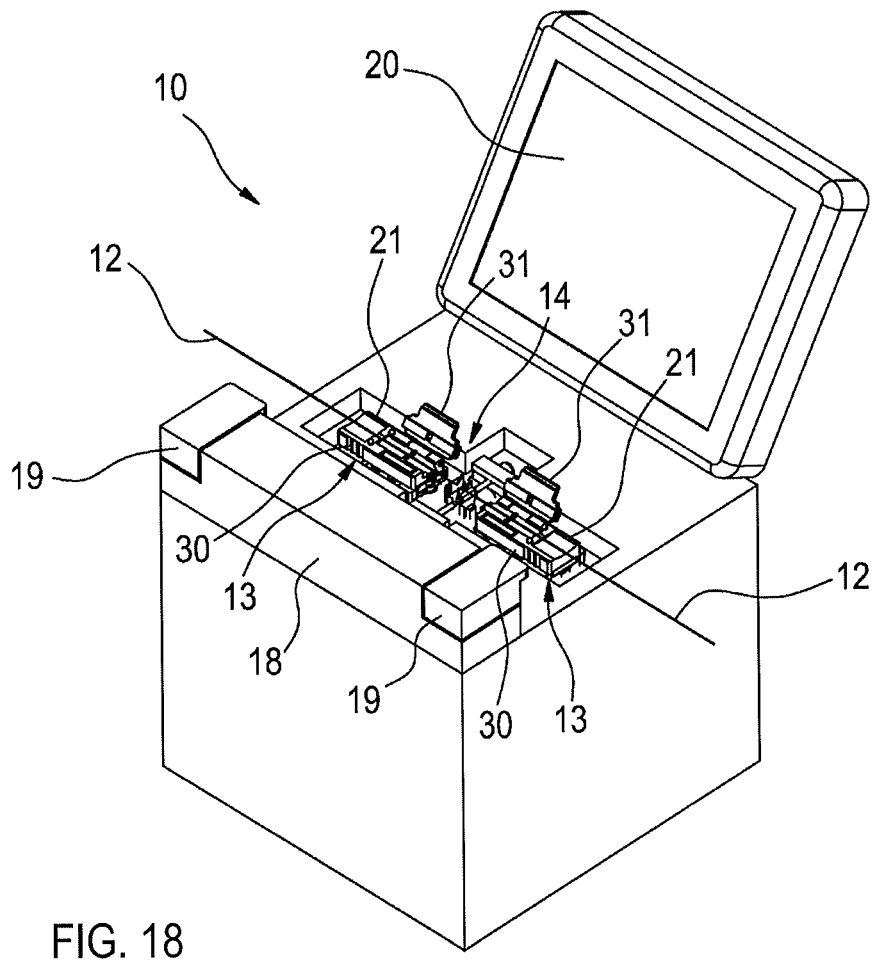
FIG. 17 is a perspective view viewed from the rear side of the fusion splicer after replacement of the positioning members.
Figure 18:
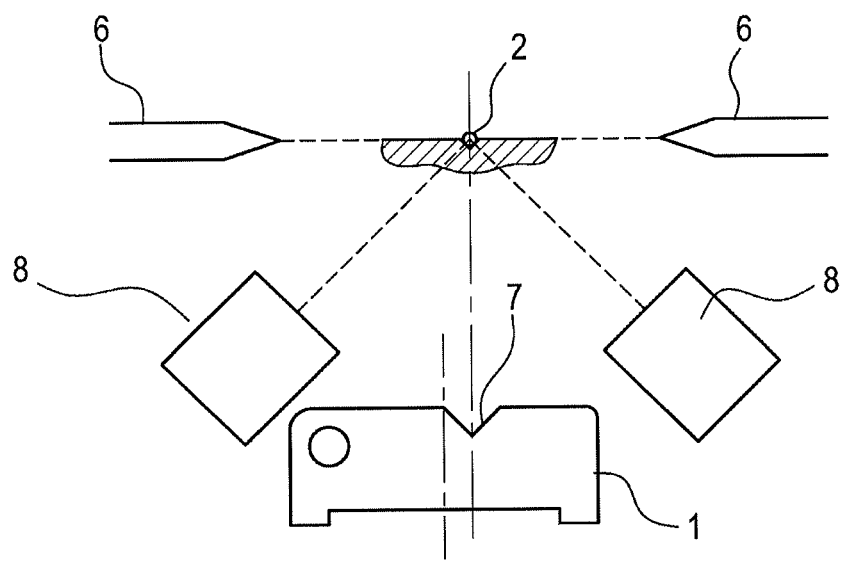
FIG. 18 is a schematic configuration diagram of a single-fiber fusion splicer.
Figure 19:
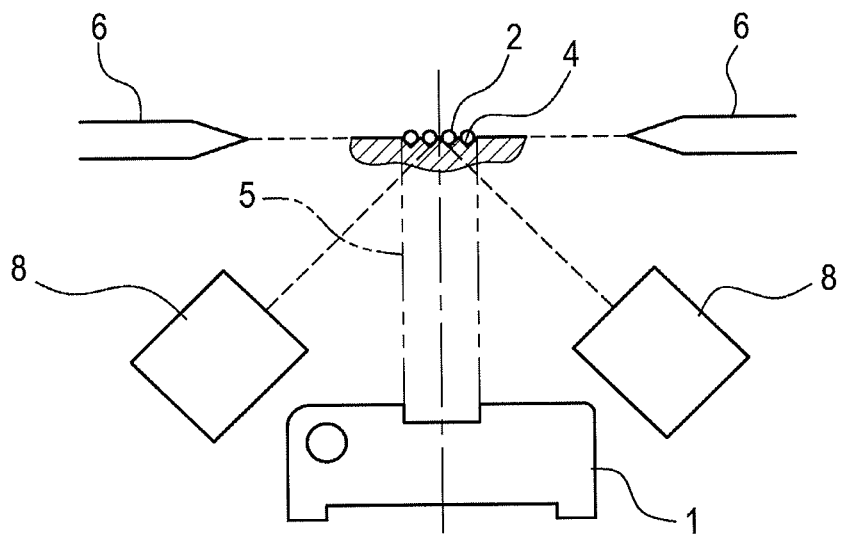
FIG. 19 is a schematic configuration diagram of a multi-fiber fusion splicer.
Figure 20:
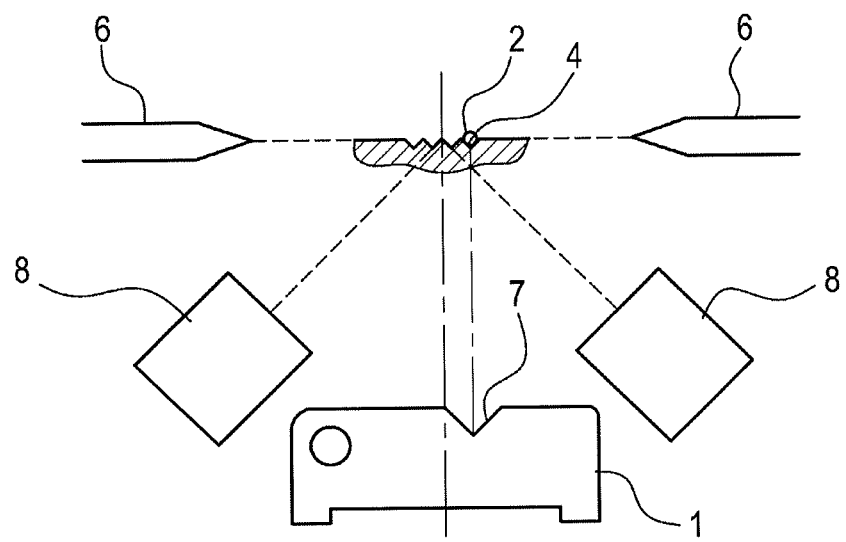
FIG. 20 is a schematic configuration diagram of a multi-fiber fusion splicer showing the case of fusing and splicing single-fiber optical fibers by the multi-fiber fusion splicer.

Consequently, as shown in FIG. 17, the worker can open the holding lids 31 of the respective optical fiber holders 21 and receive the optical fibers 12 in the receiving grooves 32 and then close the holding lids 31 and hold the optical fibers 12 in the rear side of the apparatus.

After the optical fibers 12 are held thus, the worker can operate the fusion splicer 10 while viewing an image of the monitor 20 from the back side of the apparatus, and perform electric discharge by the electrodes 16, and mutually fuse and splice end faces of the optical fibers 12 at the same fusion point P as that before the replacement work.

Thereafter, reinforcing work of a fused and spliced place of the optical fibers 12 is done by the heat-shrink processing unit 18 in the front side.

According to the present embodiment thus, even when the positioning members 50 formed on a pair of holder installation parts 13 are attached to the bases 51 after the attitudes are reversed so as to have the same ends turned to the fusion splicing part 11, the center position A4 in the width direction along the second direction Y in the base fitting part 65 is arranged in a straight line of the first direction X passing through the center position between the electrodes 16.

As a result, even when the right and left optical fiber holders 21 are reversed and mounted oppositely, a position of the receiving groove 32 is a position matching with the center position A4 in the width direction of the base fitting part 65 of the positioning member 50, and is arranged in the straight line of the first direction X passing through the center position (fusion point P) between the electrodes 16. Consequently, even when the right and left optical fiber holders 21 are reversed and mounted oppositely, the optical fibers 12 can be mutually fused and spliced well.

Also, the holding lids 31 of the respective optical fiber holders 21 are opened to the front side of the apparatus, and the holding lids 31 are opened toward the back side when viewed from a worker of the rear side of the apparatus, and it is easy to do holding work etc. of the optical fibers 12.

Also, the positioning member 50 has a structure in which the base fitting part 65 has a shape having the same width along the first direction X and the holder fitting part 66 is made of the protrusion having the same width along the first direction X and the center position A4 in the width direction along the second direction Y of the base fitting part 65 is offset with respect to the center position A3 in the width direction along the second direction Y of this holder fitting part 66. By such a structure, only by adjusting an offset amount of the base fitting part 65 to an offset amount of the receiving groove 32 of the optical fiber holder 21, the position of the receiving groove 32 can be arranged in the straight line of the first direction X passing through the fusion point P even when the optical fiber holder 21 is attached to any of the right and left holder installation parts 13.

Also, the fusion splicer 10 includes the microscopes 17 for observing a gap between the electrodes 16 of the fusion splicing part 11, and includes the monitor 20 capable of changing a vertical attitude and reversing and displaying a vertical direction of an image obtained by the microscopes 17, so that a worker can well do fusion splicing work from any of the front side and the rear side of the fusion splicer 10.

In addition, in the embodiment described above, the single-fiber fusion splicer for splicing the single-fiber optical fibers 12 has been illustrated and described, but the invention can also be applied to a multi-fiber fusion splicer for mutually fusing and splicing each of the optical fibers 12 of a multi-fiber optical fiber ribbon in which plural (for example, four to twelve) optical fibers 12 are integrated in parallel. In addition, in the case of fusing the multi-fiber optical fiber ribbon, means for forming a wide receiving groove around the receiving groove 32 of the single-fiber optical fiber holder 21 is used as the optical fiber holder 21, and the multi-fiber optical fiber ribbon is received in this wide receiving groove.

The invention has been described in detail with reference to the specific embodiment, but it is apparent to those skilled in the art that various changes or modifications can be made without departing from the spirit and scope of the invention.

The present application is based on Japanese patent application (patent application No. 2011-162072) filed on Jul. 25, 2011, and the contents of the patent application are hereby incorporated by reference.

DESCRIPTION OF REFERENCE NUMERALS AND SIGNS

10: FUSION SPLICER
11: FUSION SPLICING PART
12: OPTICAL FIBER
13: HOLDER INSTALLATION PART
14: FUSION PROCESSING UNIT
16: ELECTRODE
17: MICROSCOPE
20: MONITOR
21: OPTICAL FIBER HOLDER
50: POSITIONING MEMBER
51: BASE
65: BASE FITTING PART
66: HOLDER FITTING PART
A1: CENTER POSITION OF POSITIONING GROOVE
A2: CENTER POSITION OF OPTICAL FIBER HOLDER
A3: CENTER POSITION OF HOLDER FITTING PART
A4: CENTER POSITION OF BASE FITTING PART
X: FIRST DIRECTION
Y: SECOND DIRECTION

The invention claimed is:

1. A fusion splicer characterized in that:
a body of the fusion splicer is provided with a pair of holder installation parts configured to detachably attach optical fiber holders which holds optical fibers and to mutually but the optical fibers in a first direction, and a fusion splicing part configured to mutually fuse and splice the optical fibers by a pair of electrodes opposed along a second direction orthogonal to the first direction, and that:
the holder installation part includes a base fixed to the body, and a positioning member in which a holder fitting part fitted into the optical fiber holder is formed in an upper side and a base fitting part fitted into the base is formed in a lower side, and
the positioning member can be attached to and detached from both of the bases after an attitude is reversed so as to have the same end turned to the fusion splicing part, and a center position in a width direction along the second direction in the base fitting part is arranged in a straight line of the first direction passing through a center position between the electrodes even in a state in which the positioning member is fitted into any of the bases.

2. The fusion splicer as claimed in claim 1, characterized in that the base fitting part has the same width along the first direction, and the holder fitting part is a protrusion having the same width along the first direction and a center position in a width direction along the second direction of the holder fitting part differs from that of the base fitting part.

3. The fusion splicer as claimed in claim 1, characterized by comprising:
a microscope configured to observe a gap between the electrodes, and a monitor configured to display an image obtained by the microscope and capable of changing a vertical attitude to the body and reversing and displaying a vertical direction of the image.

4. The fusion splicer as claimed in claim 2, characterized by comprising:

a microscope configured to observe a gap between the electrodes, and a monitor configured to display an image obtained by the microscope and capable of changing a vertical attitude to the body and reversing and displaying a vertical direction of the image.

* * * * *